US006842418B2

(12) United States Patent  
Sato et al.

(10) Patent No.: US 6,842,418 B2  
(45) Date of Patent: Jan. 11, 2005

(54) RECORDING/REPRODUCING APPARATUS AND CONTROL METHOD THEREOF

(75) Inventors: Masahiko Sato, Tokyo (JP); Naoki Kamaya, Tokyo (JP)

(73) Assignee: Sony Corporation, Tokyo (JP)

( * ) Notice: Subject to any disclaimer, the term of this patent is extended or adjusted under 35 U.S.C. 154(b) by 648 days.

(21) Appl. No.: 10/032,600

(22) Filed: Oct. 19, 2001

(65) Prior Publication Data

US 2002/0054441 A1 May 9, 2002

(30) Foreign Application Priority Data

Oct. 20, 2000 (JP) ..................................... P2000-320648

(51) Int. Cl.[7] .............................................. G11B 5/09
(52) U.S. Cl. ...................................................... 369/84
(58) Field of Search ........................ 369/84, 85, 47.12, 369/30.05, 30.19, 53.21; 360/15, 57, 66

(56) References Cited

U.S. PATENT DOCUMENTS 4,823,333 A  *  4/1989  Satoh et al. .................. 369/84
5,764,607 A  *  6/1998  Maeda et al. ............. 369/47.12
6,529,452 B2 *  3/2003  Tabuchi et al. ............... 369/84

* cited by examiner

Primary Examiner—Thang V. Tran  
(74) Attorney, Agent, or Firm—Frommer Lawrence & Haug LLP; William S. Frommer

(57) ABSTRACT

A recording/reproducing apparatus and control method thereof capable of easily recording and reproducing all kinds of information obtained from broadcasts, communications and recording mediums of all types, and further capable of applying suitable restrictions on use of digital information. A hard disk drive and a video recorder/player can both record information reproduced by a DVD player and information received by a satellite tuner. When restrictions on recording such as billing conditions or limits on the number of recordings were placed in the control data, such restrictions are recorded as the discriminator ID. When the videotape cassette is then extracted from the video recorder/player, the discriminator ID is decoded and, all or a portion of the recorded contents of the hard disk identical to the information recorded on the videotape are deleted as needed. The unlimited distribution or unlimited retention of the contents recorded on the hard disk is in this way prevented, and problems such as involving copyrights are eliminated.

22 Claims, 4 Drawing Sheets

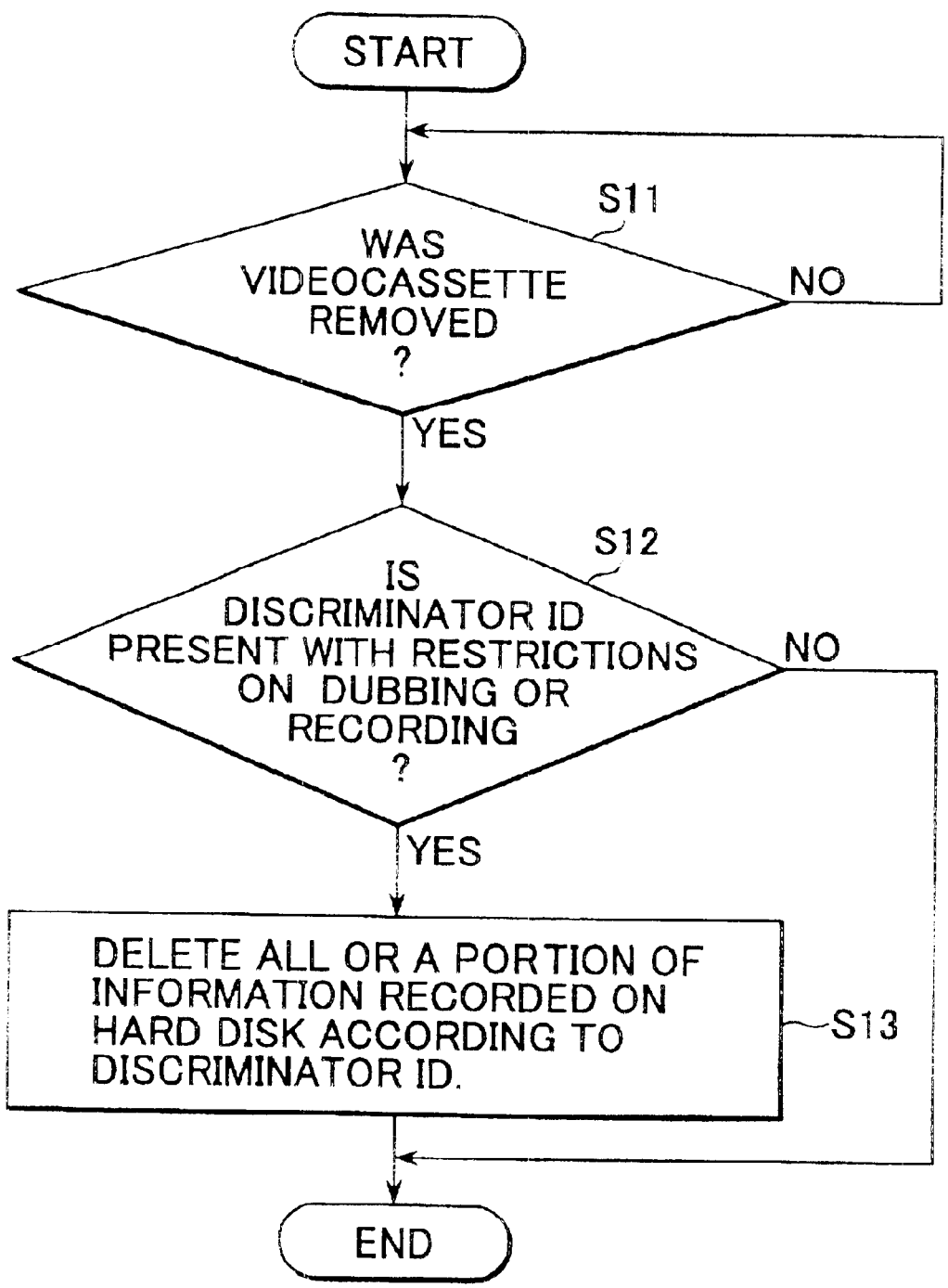

RECORDING/REPRODUCING APPARATUS AND CONTROL METHOD THEREOF

BACKGROUND OF THE INVENTION

1. Field of the Invention

The present invention relates to a recording/reproducing apparatus and control method thereof utilized for recording on a recording medium, information acquired from various means such as reproducing from a recording medium, receiving of broadcasts or communications, or input from external devices.

2. Description of the Related Art

In recording and reproducing apparatuses of the related art consisting of so-called double-deck devices and double-cassette devices utilizing magnetic tape as a recording medium, the recording/reproducing units for recording and reproducing audio and video on the magnetic tape are a two-unit set, wherein the information reproduced from magnetic tape on one recording/reproducing unit is recorded on magnetic tape onto the other recording/reproducing unit in a configuration allowing easy dubbing (recording) of various kinds of information.

However using such magnetic tape recording/reproducing units requires performing other incidental operations such as fast-forwarding or rewinding the tape during recording or reproducing, creating the problems that operating the recording/reproducing units took time and operation was inconvenient.

Other apparatus is also capable of operations such as dubbing (copying) various kinds of information utilizing high-speed large capacity recording mediums such as optical disks and magnetic disks for recording and reproducing of digital signals. Use of such recording mediums allows recording and reproducing at high speeds and operation is greatly improved during dubbing and reproducing compared to recording and reproducing on magnetic tape.

However, dubbing these kind of digital signals requires that restrictions be placed to prevent the user from unlimited dubbing (copying) or editing in order to avoid copyright problems.

SUMMARY OF THE INVENTION

The present invention therefore has the object of providing a recording/reproducing apparatus and control method capable of easy recording and reproducing of various kinds of information obtained such as from various recording media, broadcasts, and communications, capable of properly limiting the use of digital information, and further capable of resolving copyright problems.

To achieve the above objects, the recording/reproducing apparatus of the present invention is characterized in comprising a reproducing means for reproducing information recorded on a freely insertable and removable first recording medium containing the specified information and loaded in the reproducing means; a first recording/reproducing means for recording information reproduced from the first recording medium by the reproducing means onto a freely insertable and removable second recording medium installed in the first recording/reproducing means; a second recording/reproducing means for recording information reproduced from the first recording medium by the reproducing means onto a third recording medium irremovably installed in the second reproducing means; control means for erasing all or a portion of information matching the same information recorded in the second recording medium from the third recording medium by the second recording/reproducing means, when the second recording medium has been removed from the first recording medium.

A control method for the recording/reproducing apparatus of the present invention is characterized in comprising a receiving means for receiving specified information transmitted in broadcasts or communications; a first recording/reproducing means for recording information received from said receiving means onto a freely insertable and removable second recording medium installed in said first recording/reproducing means; and a second recording/reproducing means for recording information received from said receiving means onto a third recording medium irremovably installed in said second reproducing means; wherein when said second recording medium is removed from said first recording/reproducing means, then all or a portion of information identical to information recorded in said second recording medium from said third recording medium of said second recording/reproducing means is deleted.

In the recording/reproducing apparatus of the present invention, information recorded in the first recording medium is reproduced by a reproducing means, and dubbing (recording) performed on two types of recording mediums by two types of recording/reproducing means. Here, if the second recording/reproducing means having a non-removable third recording medium is a high-speed, large capacity device such as a hard disk, then high speed recording (dubbing) and high speed reproducing is possible using the second recording/reproducing means, and the third recording medium is not freely loadable (insertable/removable) so problems with unauthorized use of copyrights can be prevented by removing the third recording medium itself from the equipment.

On the other hand, if the first recording/reproducing means having a freely insertable and removable second recording medium is an apparatus for handling analog signals such as a tape recorder, then unauthorized use of copyrights by copying of digital signals can also be prevented by removing this second recording medium from the equipment.

When this second recording medium has been removed from the equipment, the (identical) information recorded in the third recording medium using the second recording/reproducing means is deleted, so that unauthorized use of copyrights by copying of digital signals can also be prevented on the third recording medium.

Instead of reproducing information recorded in the first recording medium using the reproducing means, the same processing can also be performed in cases such as when using the receiving means to receive information transmitted by broadcasts or communications, or when using information from external devices input by an input means.

In the control method for the recording/reproducing apparatus of the present invention, information recorded in the first recording medium is reproduced by a reproducing means, and dubbing (recording) performed on two types of recording mediums by two types of recording/reproducing means. Here, if the second recording/reproducing means having a non-removable third recording medium is a high-speed, large capacity device such as a hard disk, then high speed recording (dubbing) and high speed reproducing is possible using the second recording/reproducing means, and further, the third recording medium is not freely loadable (insertable/removable) so problems with unauthorized use of copyrights can be prevented by removing the third recording medium itself from the equipment.

On the other hand, if the first recording/reproducing means having a freely insertable and removable second recording medium is an apparatus for handling analog signals such as a tape recorder, then unauthorized use of copyrights by copying of digital signals can also be prevented by removing this second recording medium from the equipment.

When this second recording medium has been removed from the equipment, the (identical) information recorded in the third recording medium using the second recording/ reproducing means is deleted, so that unauthorized use of copyrights by copying of digital signals can also be prevented on the third recording medium.

Instead of reproducing information recorded in the first recording medium using the reproducing means, the same processing can also be performed in cases such as when using the receiving means to receive information transmitted by broadcasts or communications, or when using information from external devices input by an input means.

The recording/reproducing apparatus of the present invention as described above, therefore records information reproduced from a first recording medium, receives information from receiving means, or inputs information from input means onto a second recording medium by two kinds of recording/reproducing means, and deletes all or a portion of information recorded in the fixed (nonremovable) third recording medium according to the contents, when the freely insertable and removable second recording medium is removed from the apparatus.

Therefore, even information restricted to being recorded under fixed limits onto a designated recording medium (in other words, the third recording medium), can be recorded onto that designated recording medium within those limits; the play processing can make maximum use of the capabilities (play speed and information quality) of that designated recording medium; and further the unconditional (unrestricted) distribution of that designated recording medium and unconditional continuing existence of that information can be prevented, so that for example copyright problems do not arise.

The control method for the recording/reproducing apparatus of the present invention as described above, therefore records the play information, from a first recording medium, receives information from a receiving means, or inputs information from an input means onto a second recording medium by two kinds of recording/reproducing means and, deletes all or a portion of information recorded in the fixed (irremovable) third recording medium according to the contents when the freely insertable and removable second recording medium is removed from the apparatus.

Therefore, even information restricted to being recorded under fixed limits onto a designated recording medium (in other words, the third recording medium), can be recorded onto that designated recording medium within those limits; the play processing can make maximum use of the capabilities (play speed and information quality) of that designated recording medium; and further the unconditional (unrestricted) distribution of that designated recording medium and unconditional continuous existence of that information can be prevented, so that for example copyright problems do not arise.

BRIEF DESCRIPTION OF THE DRAWINGS

FIG. 4 is a flowchart showing the operation of the recording/reproducing apparatus shown in FIG. 1.

DETAILED DESCRIPTION OF THE PREFERRED EMBODIMENTS

The embodiments of the recording/reproducing apparatus and control method of the present invention are described next while referring to the accompanying drawings.

Figure 1:
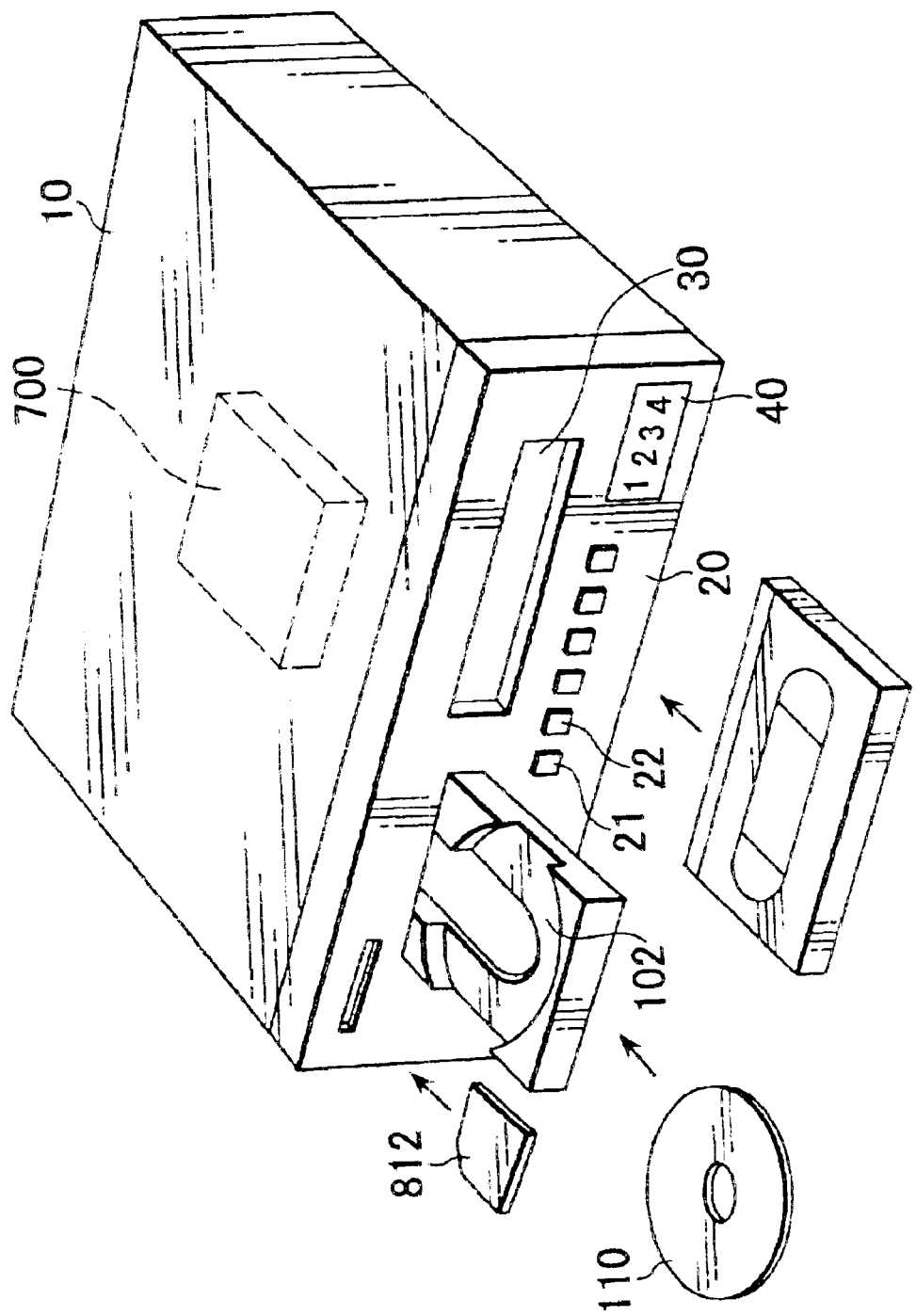
FIG. 1 is a perspective view showing the recording/ reproducing apparatus of the embodiment of the present invention.
Figure 2:
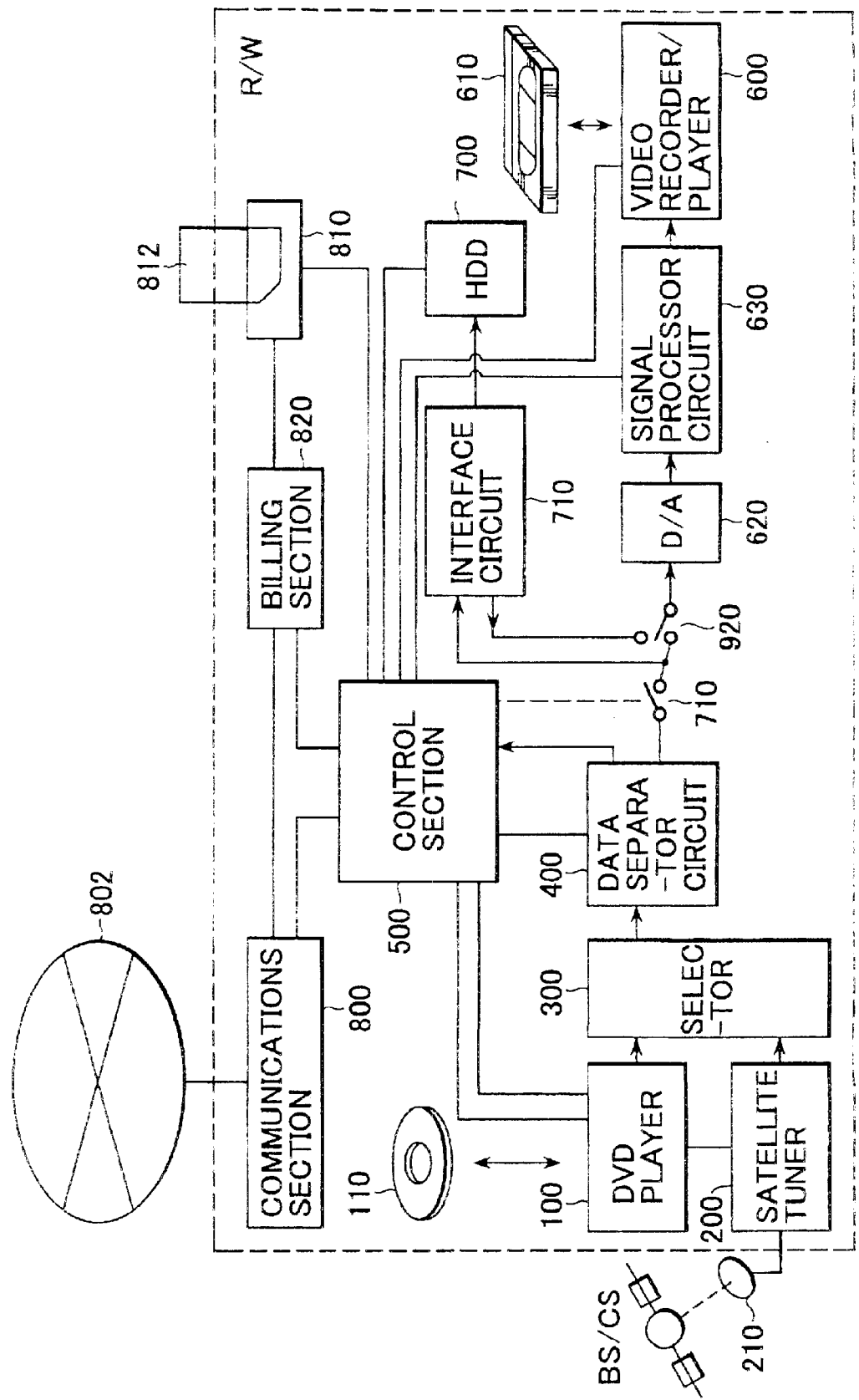
FIG. 2 is a block diagram showing the structure of the control circuit of the recording/reproducing apparatus shown in FIG. 1.

FIG. 1 is a perspective view showing the recording/ reproducing apparatus of the embodiment of the present invention. FIG. 2 is a block diagram showing the structure of the control circuit of the recording/reproducing apparatus shown in FIG. 1.

The DVD player 100 in FIG. 2 is an example of a reproducing means for reproducing the digital signal from the DVD 110 constituting the first recording medium.

This DVD player 100 holds the insertable (loadable) DVD 110. As shown in FIG. 1, a DVD 110 is set inside a tray 102 protruding from the front side of the case 10 of the recording/reproducing apparatus, and by pressing the front edge of the tray 102 by hand, a disk mechanism not shown in the drawing operates, the tray 102 and the DVD 110 are drawn into the case 10, and set in a specified play section of the DVD player 100 and play of the digital signal commences.

By pressing an eject button 21, the on-going play of the DVD 110 ends, the tray 102 is ejected, and the DVD 110 can then be extracted. This example described a dedicated player solely for reproducing operation as the reproducing means however a recording function may also be provided.

In FIG. 2 shows an example of a receiving means wherein a satellite tuner 200 receives a digital broadcast by way of an antenna 200, demodulates the digital broadcast provided by the broadcast satellite BS and the communications satellite CS, to acquire digital signals for each program. This example was used to describe a receiving means for receiving digital broadcasts but the receiving means may also be constituted by a means for receiving digital signals over broadband by way of cable signals or radio signals.

Besides the reproducing means constituted by the DVD player 100 and the receiving means constituted by the satellite tuner 200, an input means may be installed for example by connecting a cable to an external device such as a communications device and inputting digital signals.

The digital signals reproduced by the above mentioned DVD player 100 and the digital signals received by the satellite tuner 200 can be selected by a selector 300 and sent to the data separator circuit 400.

The data separator circuit 400 separates the control data and various types of control data contained in the digital signals input by the selector 300, from the main video/audio signal and sends them to the control section 500.

The video recorder/player 600 may for example be a VHS type video tape recorder, and is one example of the first recording/reproducing means for recording/reproducing of audio/video analog signals on a freely insertable/removable video tape cassette 610 constituting the second recording medium.

Inserting the videotape cassette 610 from the insertion slot 30 of the case 10, activates a push-release mechanism not shown in the drawing, and the videotape cassette 610 is then set into the video recorder/player 600, the magnetic tape is loaded and the audio/video signals are recorded or reproduced.

Pressing the eject button 22 installed in the operating section 20 during reproducing of the videotape, ends the operation, the videotape cassette 610 is ejected and the videotape cassette 610 can be removed.

A D/A converter 620 converts the digital audio/video signals into analog signals for recording on the videotape cassette 610. A signal processor circuit 630 performs specified signal processing of the audio/video signals from the D/A converter 620 for recording onto the videotape cassette 610.

A hard disk drive 700 is one example of a second recording/reproducing means for recording and reproducing signals by utilizing the hard disk constituting the third recording medium. The hard disk is installed in the hard disk drive 700 affixed within the case 10, and under normal circumstances cannot be removed from the case 10.

An interface circuit 710 performs accessing for recording and reproducing operations on the hard disk drive 700, and when required can perform recording and reproducing by parallel processing.

A communications section 800 is a connection means for connecting to a network such as the Internet 802, and is configured to perform exchange of various information between servers over a network.

A memory reader/writer 810 performs reading and writing of data on a memory card 812, and for example can be utilized to calculate various bills and goods purchases on prepaid type memory cards or a debit cards, etc.

A billing section 820 performs billing processing when for example, dubbing information on the DVD 110 reproduced by the DVD player 100 and recording information received by the satellite tuner 200, and is capable of selectively performing operations based on control data acquired by the data separator circuit 400.

In this example in other words, the billing processing during dubbing recording or receiving broadcasts is performed by a combination of the functions of the communications section 800, the memory card reader/writer 810 and the billing section 820, and capable of handling the estimated various billing (payment) processing. The specific content of the billing processing does not directly involve the present invention, a variety of methods are assumed to become possible in the future, and there are no particular restrictions.

A first switch 910 opens and closes the transmission line between the data separator circuit 400, the hard disk drive 700 and the video recorder/player 600, and if the information being reproduced by the DVD player 100 is information whose dubbing is prohibited or if the information received by the satellite tuner 200 is information whose recording is prohibited, then the transmission line from the data separator circuit 400 to the hard disk drive 700 as well as to the video recorder/player 600 is opened, shutting off the transmission of information.

A second switch 920 selectively switches the transmission line between the data separator circuit 400, the hard disk drive 700 and the video recorder/player 600. In other words, in this example, the information reproduced by the DVD player 100 or the information received by the satellite tuner 200 can be recorded by both or either the hard disk drive 700 and the video recorder/player 600.

To record with both the hard disk drive 700 and the video recorder/player 600, along with starting up the interface circuit 710, the hard disk drive 700 and the video recorder/player 600 are connected by the second switch 920, and while sending information from the data separator circuit 400 and recording it on the hard disk drive 700, the information simultaneously reproduced (reproduced) on the hard disk drive 700 is sent to the video recorder/player 600 and recorded on the videotape cassette 610.

Also, when recording only on the hard disk drive 700, the interface circuit 710 starts up, and information from the data separator circuit 400 is sent to the hard disk drive 700. In this case however, the information reproduced on the hard disk drive 700 is not sent to the video recorder/player 600.

When recording only with the video recorder/player 600, the data separator circuit 400 and the video recorder/player 600 are connected by the second switch 920, and the information from the data separator circuit 400 is sent to the video recorder/player 600 and recorded on the videotape cassette 610.

When recording on both the hard disk drive 700 and the video recorder/player 600, recording in this example is performed in the video recorder/player 600 by parallel play and recording on the hard disk drive 700 through the interface circuit 710. However the information may also be recorded on the hard disk drive 700 and when finished, the hard disk drive 700 may be reproduced, and the information may be sent to the video recorder/player 600 and recorded.

Therefore in either case of recording using the hard disk drive 700, after finishing recording onto the hard disk drive 700 within a short time, recording can continue on the video recorder/player 600 so particularly when recording information received on the satellite tuner 200, the advantages are obtained that communication access time can be shortened and the communication costs reduced.

The control section 500 provides coordinated control of each section of the recorder/player as described above. The processing that is the unique feature of the processing of this example is performed while referring to the flowcharts of FIG. 3 and FIG. 4.

Figure 3:
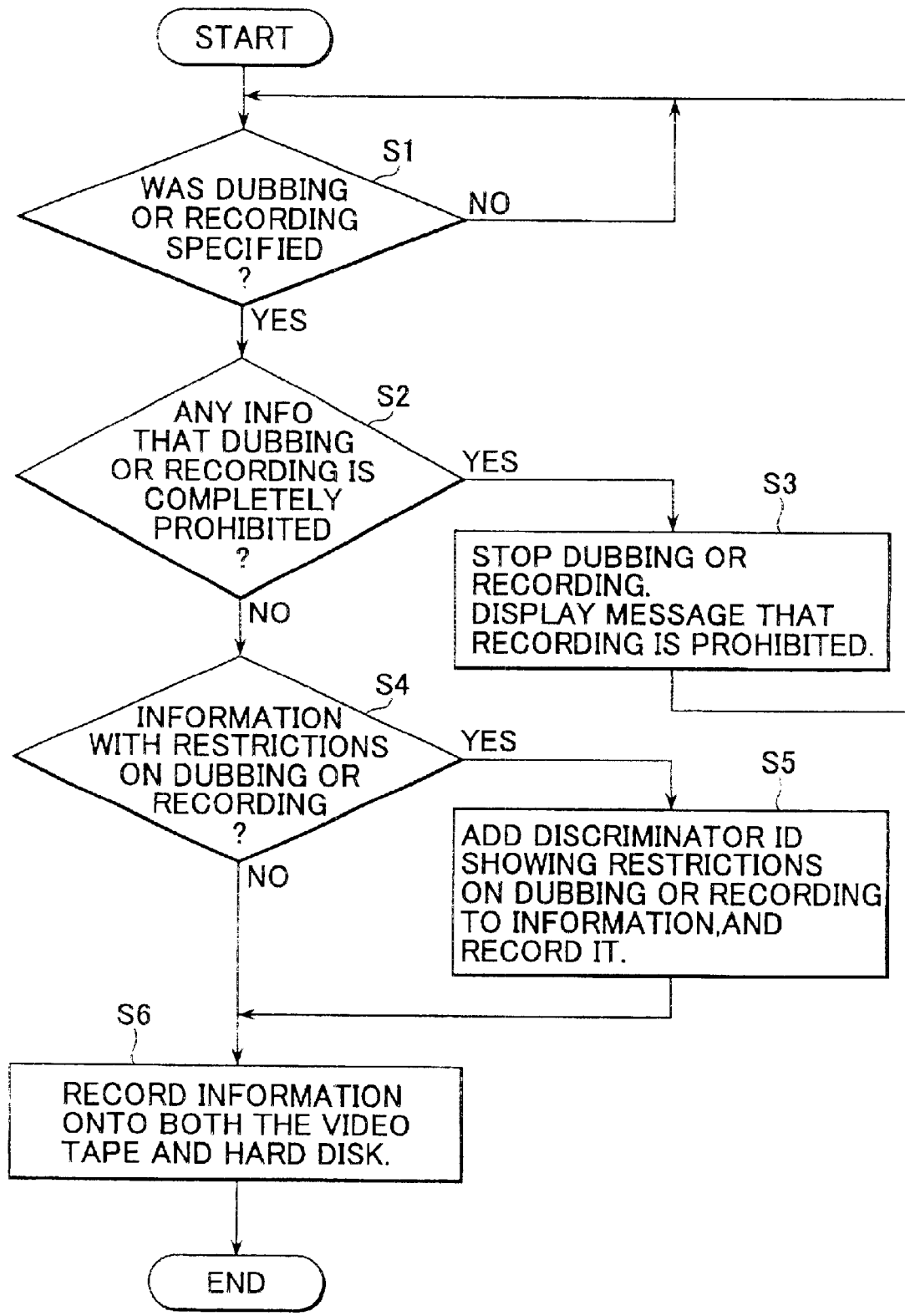
FIG. 3 is a flowchart showing the operation of the recording/reproducing apparatus shown in FIG. 1.

In other words, when recording information reproduced by the DVD player 100 and the information received by the satellite tuner 200 on both the hard disk drive 700 and the video recorder/player 600 as shown in FIG. 3, recording can be performed with fixed restrictions specified in the control data for that information.

When the videotape cassette 610 has been extracted from the video recorder/player 600 as shown in the processing in FIG. 4, all or a portion of the contents recorded on the hard disk that match the recorded contents of the videotape cassette 610 are deleted.

A liquid crystal display 40 displays various information such as the equipment status based on control by the control section 500.

An operating section 20 contains entry keys for performing various operations with this equipment and besides the above mentioned eject buttons 21, 22, is also installed with operating keys for selecting each record/play mode.

Though not shown in the drawings, the reproducing signals from the video recorder/player 600 and the hard disk drive 700, are output to external monitors by way of the play system, and audio is issued from the speakers along with the displaying of images on the monitor screens.

The control method for the recording/reproducing apparatus of the present embodiment is next described based on the flow charts in FIG. 3 and FIG. 4.

First, in FIG. 3, when the recording (dubbing) of information reproduced by the DVD player 100, or the recording of information received by the satellite tuner 200 is commanded (step S1), the control section 500 reads the control data for that information, and determines whether or not there are restrictions on dubbing and recording.

These restrictions for example include, (1) complete prohibition of all dubbing or recording, (2) allowing recording or dubbing under the condition that a fee is charged, (3) limiting dubbing or recording to three generations (3 times) and other information (4) may be dubbed or recorded unconditionally.

Upon determining among the above restrictions, that dubbing or recording is completely prohibited (step S2), the above mentioned first switch 910 opens so that information from the DVD player 100 and the satellite tuner 200 is not sent to the hard disk drive 700 and the video recorder/player 600, and the liquid crystal display 40 and external monitors show that dubbing or recording of information is completely prohibited (step S3).

When dubbing or recording is not completely prohibited, but subject to billing or limited to a certain number of recordings (step S4), information indicating those restrictions is added to the discriminator ID, and operation shifts to dubbing or recording (step S5, S6) upon satisfying those conditions such as billing. The dubbing or recording in these cases is recording onto both the hard disk drive 700 and the video recorder/player 600.

More specifically, in the case of billing (payment) conditions, the operation awaits payment by the user and at the point when payment is approved, a discriminator ID is added. In the case of limitations on generations (number of recordings), the number of dubbings/recordings is determined, and if within the allowable limits, then a discriminator ID is added with the number of dubbing/recordings rewritten (updated).

The discriminator ID is added by overlapping it onto the watermark of the information for recording or dubbing or the V blanking period of the video signal.

The discriminator ID is also monitored along with control data for the information within the control section 500.

In step 4, in cases where there are no restrictions at all on dubbing or recording, the dubbing or recording of the information begins (step S6).

Next, after this kind of dubbing or recording is finished, the control section 500 monitors whether or not the videotape cassette 610 was removed (step 611).

In a state where the videotape cassette 610 has not been removed, the dubbed and recorded information is then reproduced using the hard disk. Reproducing of digital signals can in this way be performed using the high speed operation of the hard disk, and quick reproducing as well as clear video can be obtained. Satisfactory images can therefore be viewed and enjoyed.

When the videotape cassette 610 has been removed, a determination is made (step S12) as to whether or not a discriminator ID has been added along with the dubbing or recording restrictions in step S4 from among the information recorded on the videocassette 610. When a discriminator ID has been added to the information, decoding that discriminator ID allows determining if leaving that information on the hard disk drive 700 is permitted or not, and if not permitted, that restricted information is deleted from the hard disk (step S13).

Therefore, only the allowable information still remains in the hard disk after removal of the videotape cassette 610, and other information is deleted. In other words, all or a portion of the digital information recorded on the hard disk can be appropriately deleted from the viewpoint (protecting) copyrights.

In an operation of this kind, the information on the hard disk is automatically deleted, and the available capacity of the hard disk increases so that the user need not worry about the remaining capacity of the hard disk, consecutive long-term use is possible and the space can be effectively used such as for recording of other information.

Restrictions on dubbing and recording such as completely prohibiting recording, payment conditions and limiting the generations (number of recordings) were described above, however with the increasing progress in digitizing of (information) contents it can be assumed that restrictions such as the disabling of digital signal dubbing or recording, and enabling analog signal recording or dubbing may be required, so that measures to implement these restrictions may be contrived.

The above example also described using a DVD as the first recording medium, and a video disk as the second recording medium, and the hard disk as the third recording medium, however the present invention is not limited by this example.

The first recording medium and reproducing means for example, may utilize an analog VTR player such as VHS instead of a DVD player, a digital VTR player such as DV, D-VHS or a video CD may also be used.

The second recording medium and the first recording/reproducing means may utilize a digital VTR recorder/player such as DV or D-VHS instead of a video recorder/player, and may also utilize a DVD-RAM or DVD-R, etc.

The third recording medium and the second recording/reproducing means may utilize a semiconductor memory instead of a hard disk drive.

An apparatus for handling video/audio signals was described in the above example, however devices handling only audio signals or handling information such as information handled by a general-purpose computer may also be utilized. Also, recording mediums and recording/reproducing means of various types may be selected and an apparatus configured according to the type of information being handled.

What is claimed is:

1. A recording/reproducing apparatus, comprising:
   reproducing means for reproducing information recorded on a freely insertable and removable first recording medium containing the specified information and inserted in said reproducing means;
   first recording/reproducing means for recording information reproduced from said first recording medium by said reproducing means onto a freely insertable and removable second recording medium inserted in said first recording/reproducing means;
   second recording/reproducing means for recording information reproduced from said first recording medium by said reproducing means onto a fixed third recording medium installed in said second reproducing means and;
   control means for deleting all or a portion of information matching the same information recorded onto said second recording medium from said third recording medium by said second recording/reproducing means, when said second recording medium has been removed from said first recording/reproducing means.

2. A recording/reproducing apparatus according to claim 1, comprising:

identifier means for checking whether or not fixed restrictions are present on recording onto other recording media, information from said first recording medium reproduced by said reproducing means, wherein when said identifier means determines that fixed restrictions are applied, then said control means deletes all or a portion of information identical to information recorded on said second recording medium by said second recording/reproducing means from said third recording medium when said second recording medium is removed from said first recording/reproducing means.

3. A recording/reproducing apparatus according to claim 1, wherein the recording by said first recording/reproducing means and the recording by said second recording/reproducing means are performed in parallel.

4. A recording/reproducing apparatus according to claim 1, wherein information reproduced from said first recording medium by said reproducing means is recorded on said third recording medium by said second recording/reproducing means, and the information reproduced from said third recording medium by said second recording/reproducing means is recorded on said second recording medium by said first recording/reproducing means.

5. A recording/reproducing apparatus according to claim 1, wherein said first recording medium and said third recording medium are recording mediums for digital signals.

6. A recording/reproducing apparatus comprising:

receiving means for receiving specified information from a broadcast or communications;

first recording/reproducing means for recording information received by said receiving means onto a freely insertable and removable second recording medium inserted in said first recording/reproducing means;

second recording/reproducing means for recording information received by said receiving means onto a fixed third recording medium installed in said second reproducing means; and control means for deleting all or a portion of information matching the same information recorded on said second recording medium from said third recording medium by said second recording/reproducing means, when said second recording medium is removed from said first recording/reproducing means.

7. A recording/reproducing apparatus according to claim 6, comprising:

identifier means for checking information received from said receiving means to find whether or not fixed restrictions are present on recording said information on other recording media, and when said identifier means determines that fixed restrictions are applied, then said control means deletes all or a portion of information identical to information recorded on said second recording medium by said second recording/reproducing means from said third recording medium, when said second recording medium is removed from said first recording/reproducing means.

8. A recording/reproducing apparatus according to claim 6, wherein the recording by said first recording/reproducing means and the recording by said second recording/reproducing means are performed in parallel.

9. A recording/reproducing apparatus according to claim 6, wherein information received by said receiving means is recorded on said third recording medium by said second recording/reproducing means, and the information reproduced from said third recording medium by said second recording/reproducing means is recorded onto said second recording medium by said first recording/reproducing means.

10. A recording/reproducing apparatus comprising an input means for inputting specified information from an external device;

first recording/reproducing means for recording information input from said input means onto a freely insertable and removable second recording medium inserted in said first recording/reproducing means;

second recording/reproducing means for recording information input from said input means onto a fixed third recording medium installed in said second reproducing means and;

control means for erasing all or a portion of information matching the same information recorded in said second recording medium from said third recording medium of said second recording/reproducing means, when said second recording medium has been removed from said first recording/reproducing means.

11. A recording/reproducing apparatus according to claim 10, comprising:

identifier means for checking information input from said receiving means to find whether or not fixed restrictions are present on recording the information onto other recording media, wherein when said identifier means determines that fixed restrictions are applied, then said control means deletes all or a portion of information identical to information recorded on said second recording medium by said second recording/reproducing means from said third recording medium when said second recording medium is removed from said first recording/reproducing means.

12. A recording/reproducing apparatus according to claim 10, wherein the recording by said first recording/reproducing means and the recording by said second recording/reproducing means are performed in parallel.

13. A recording/reproducing apparatus according to claim 10, wherein information input from said input means is recorded on said third recording medium by said second recording/reproducing means, and the information reproduced from said third recording medium by said second recording/reproducing means is recorded on said second recording medium by said first recording/reproducing means.

14. A control method for a recording/reproducing apparatus which comprises:

reproducing means for reproducing information recorded on a freely insertable and removable first recording medium containing the specified information and inserted in said reproducing means;

first recording/reproducing means for recording information reproduced from said first recording medium by said reproducing means onto a freely insertable and removable second recording medium inserted in said first recording/reproducing means; and second recording/reproducing means for recording information reproduced from said first recording medium by said reproducing means onto a fixed third recording medium installed in said second reproducing means, wherein said control method deletes all or a portion of information identical to the same information recorded in said second recording medium from said third recording medium by said second recording/reproducing means when said second recording medium has been removed from said first recording/reproducing means.

15. A control method for a recording/reproducing apparatus according to claim 14 which comprises:

identifier means for checking whether or not fixed restrictions are present on recording onto other recording media, information from said first recording medium reproduced by said reproducing means, wherein when said identifier means determines that fixed restrictions are applied, then all or a portion of the information identical to information recorded on said second recording medium by said second recording/reproducing means from said third recording medium is deleted, when said second recording medium is removed from said first recording/reproducing means.

16. A control method for a recording/reproducing apparatus according to claim 14, wherein said first recording medium and said third recording medium are recording mediums for digital signals, and said second recording medium is a recording medium for analog signals.

17. A control method for a recording/reproducing apparatus which comprises:

receiving means for receiving specified information from a broadcast or communications;

first recording/reproducing means for recording information received by said receiving means onto a freely insertable and removable second recording medium inserted in said first recording/reproducing means; and second recording/reproducing means for recording information received by said receiving means onto a fixed third recording medium installed in said second reproducing means, wherein all or a portion of information identical to the same information recorded in said second recording medium from said third recording medium by said second recording/reproducing means is deleted when said second recording medium is removed from said first recording/reproducing means.

18. A control method for a recording/reproducing apparatus according to claim 17, wherein said control method determines whether or not fixed restrictions are present on recording information received by said receiving means onto other recording media, and upon determining that fixed restrictions were applied, deletes all or a portion of information identical to information recorded on said second recording medium by said second recording/reproducing means from said third recording medium, when said second recording medium is removed from said first recording/reproducing means.

19. A control method for a recording/reproducing apparatus according to claim 17, wherein said third recording medium is a recording medium for digital signals, and said second recording medium is a recording medium for analog signals.

20. A control method for a recording/reproducing apparatus which comprises:

input means for inputting information from an external device;

first recording/reproducing means for recording information input from said input means onto a freely insertable and removable second recording medium inserted in said first recording/reproducing means; and second recording/reproducing means for recording information input from said input means onto a fixed third recording medium installed in said second reproducing means wherein said control method deletes all or a portion of information matching the same information recorded in said second recording medium from said third recording medium by said second recording/reproducing means when said second recording medium has been removed from said first recording/reproducing means.

21. A control method for a recording/reproducing apparatus according to claim 20, wherein a determination is made as to whether or not fixed restrictions are present on recording the information onto other recording media, and when determined that fixed restrictions are applied, all or a portion of information identical to information recorded on said second recording medium by said second recording/reproducing means from said third recording medium is deleted, when said second recording medium is removed from said first recording/reproducing means.

22. A control method for a recording/reproducing apparatus according to claim 20, wherein said third recording medium is a recording medium for digital signals, and said second recording medium is a recording medium for analog signals.

* * * * *